J. H. CONNOLLY.
WIND MOTOR.
APPLICATION FILED OCT. 29, 1917.

1,294,877.

Patented Feb. 18, 1919.
4 SHEETS—SHEET 1.

Witnesses

Inventor
J. H. Connolly
By Victor J. Evans
Attorney

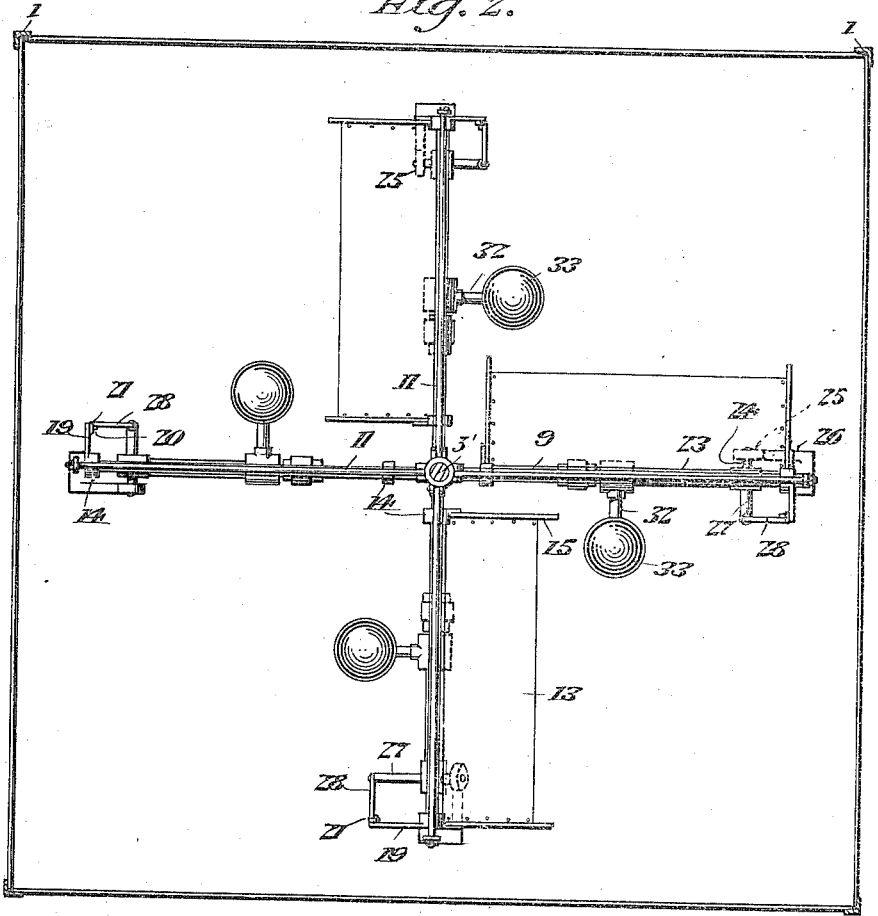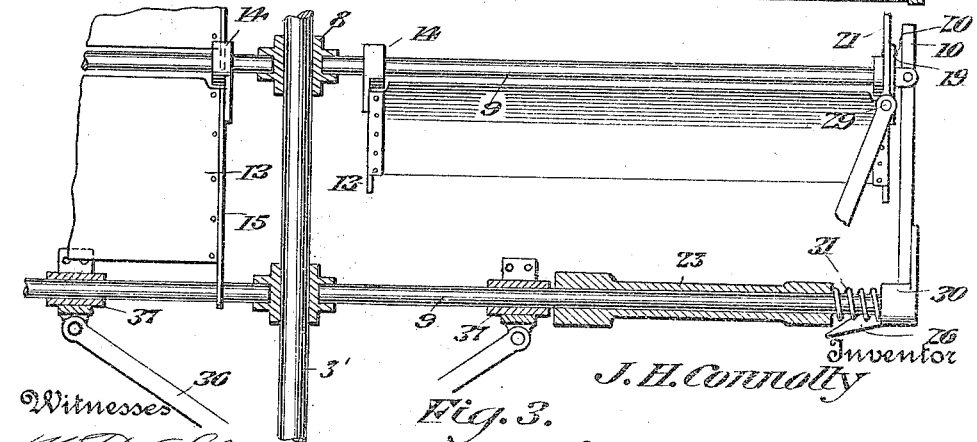

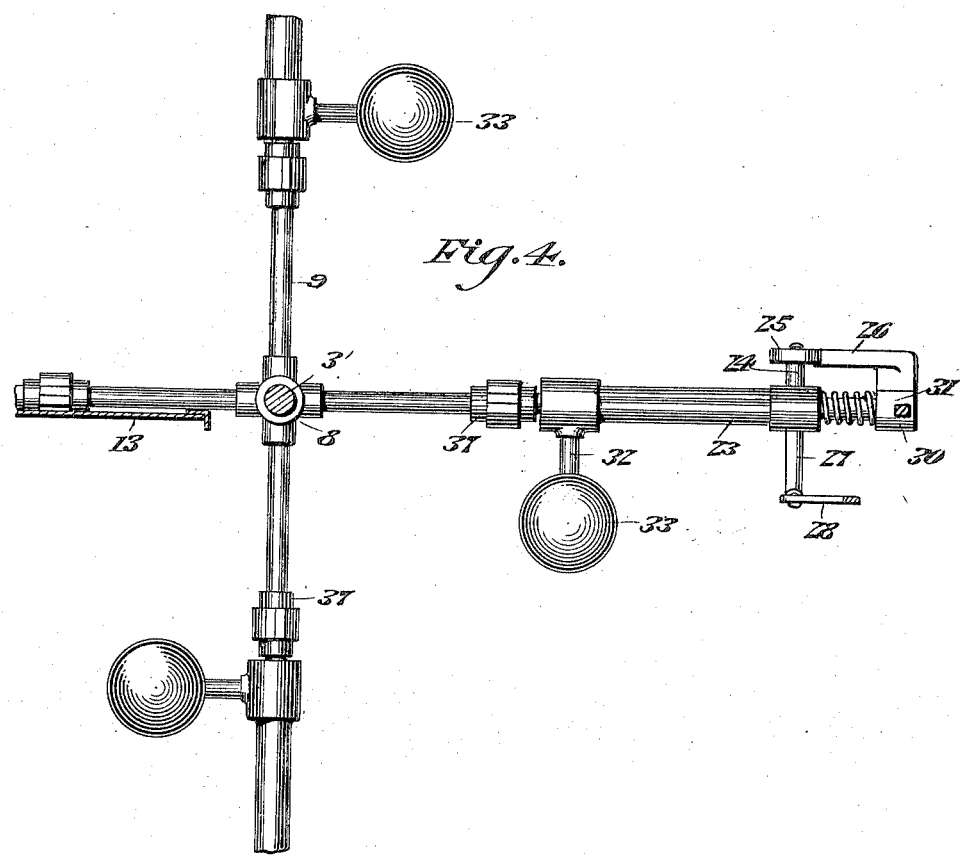
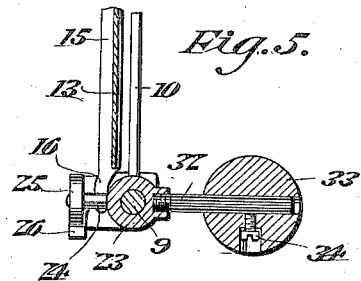

UNITED STATES PATENT OFFICE.

JAMES H. CONNOLLY, OF EL PASO, TEXAS.

WIND-MOTOR.

1,294,877.  Specification of Letters Patent.  Patented Feb. 18, 1919.

Application filed October 29, 1917. Serial No. 198,987.

*To all whom it may concern:*

Be it known that I, JAMES H. CONNOLLY, a citizen of the United States, residing at El Paso, in the county of El Paso, and State of Texas, have invented new and useful Improvements in Wind-Motors, of which the following is a specification.

This invention relates to wind motors or wind mills, the object in view being to produce an especially powerful motor of the class referred to.

One of the principal objects of the present invention is to provide in connection with groups or columns of pivotally mounted wings or blades, adapted to swing or turn on substantially horizontal axes, novel means for producing an automatic feathering action of the wings or blades in accordance with and in proportion to the velocity of the wind to which the motor or mill is exposed.

Another object of the invention is to provide in connection with such wings or blades, means for counter-balancing the blades as well as feathering the same when subjected to increased wind velocity, the counterbalancing means and the feathering means being intimately associated.

Another object of the invention is to provide means controlled manually for feathering all of the blades so as to throw the motor or mill out of action, when for example, the wind reaches a velocity which would be destructive to the motor or when the motor is not in use.

With the above and other objects in view, the invention consists in the novel construction, combination and arrangement of parts, herein described, illustrated and claimed.

In the accompanying drawings:—

Fig. 2 is a top plan view thereof;

Fig. 3 is an enlarged diametrical section through the lower portion of the motor.

Fig. 4 is an enlarged fragmentary section on the line 4—4 of Fig. 1.

Fig. 5 is a fragmentary vertical section on the line 5—5 of Fig. 1.

Figure 1:
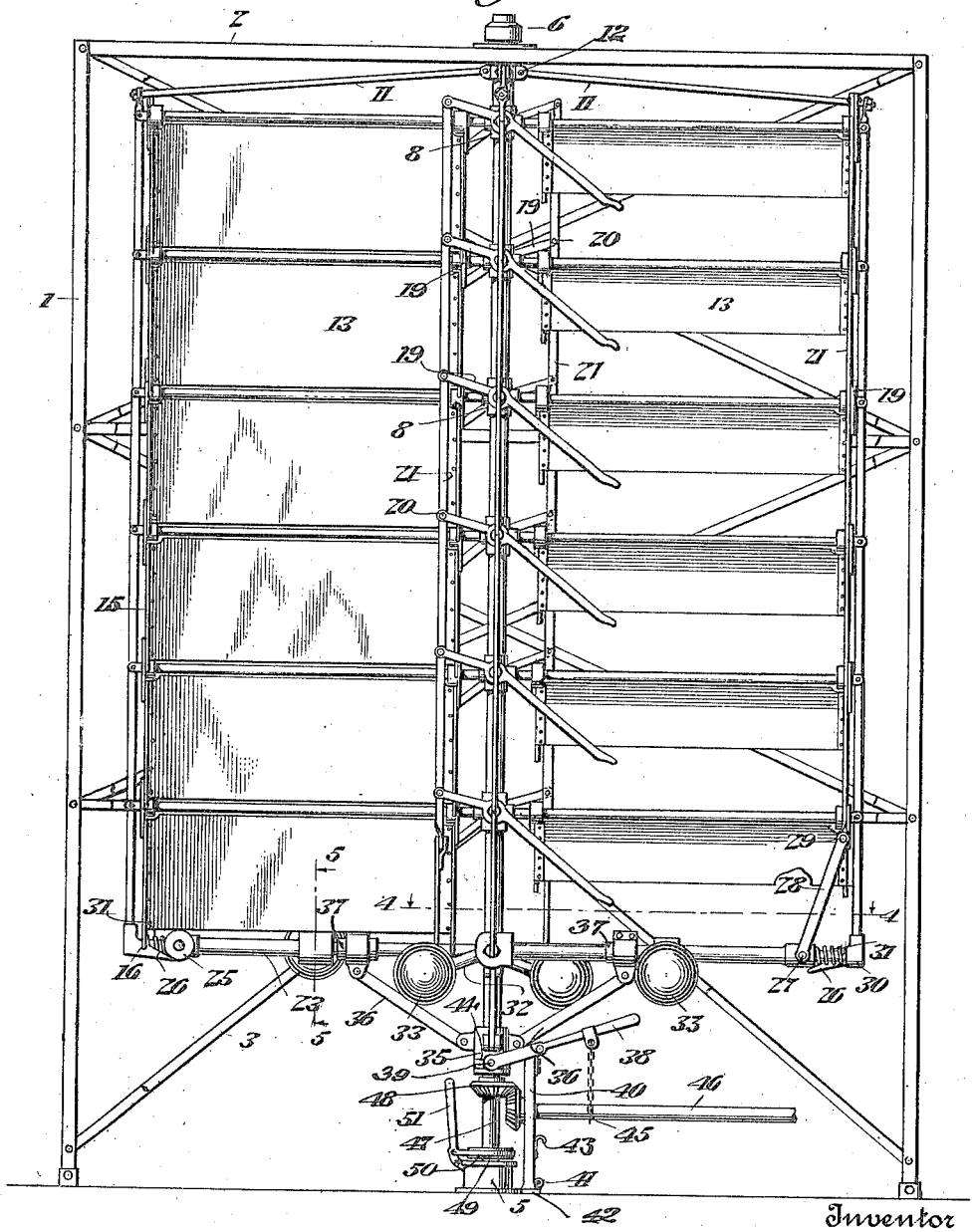
Figure 1 is a view in elevation of the improved wind motor or mill.
Figure 6:
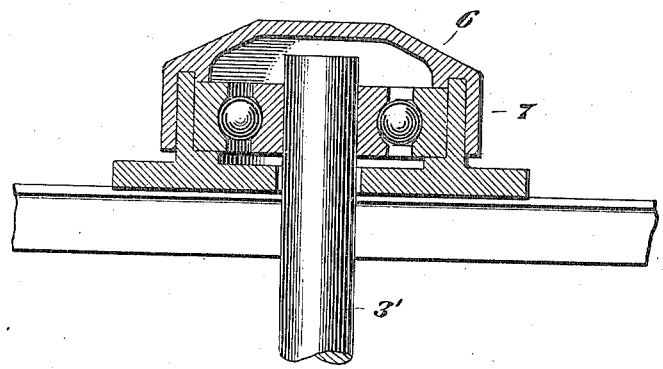
Fig. 6 is a detail view of the top bearing.
Figure 7:
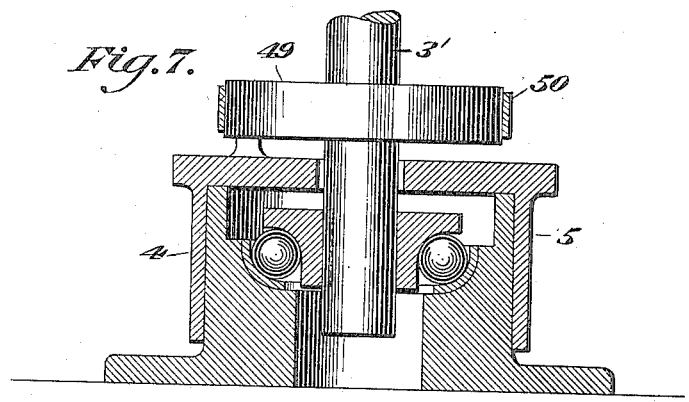
Fig. 7 is a similar view of the bottom bearing.
Figure 8:
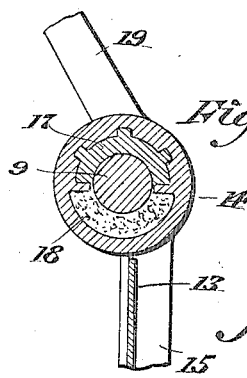
Fig. 8 is a sectional view of one of the hangers or bearings for the wings.

In the preferred embodiment of the invention, I construct a suitable frame-work shown as generally rectangular in formation, comprising a series of uprights or standards 1 connected at their upper extremities, by top cross bars 2 and connected adjacent to their lower extremities by other horizontal frame bars 3, a rigid supporting frame being thus provided, of sufficient size to contain the working parts of the motor or mill.

3' designates a vertical rotary shaft extending centrally of the frame work and journaled at its lower end in a ball bearing 4 contained within a two-part telescopic housing 5 supported upon a suitable bed or floor as shown. The upper extremity of the shaft 3 is mounted in a top ball bearing 6 contained within a two-part telescopic casing 7 secured to and supported by one or more of the top cross bars of the framework. Secured to the shaft 3' is a vertical series of hub-like members 8 arranged equidistantly from each other and extending outwardly or radiating from each of said hub-like members 8 is a plurality of substantially horizontal shafts 9, four of such shafts being illustrated in connection with each hub 8 although the number of shafts 9 may be increased or diminished. The outer extremities of the shafts 9 are connected by vertical supporting bars 10 and the upper extremities of the bars 10 have connected therewith inwardly and upwardly inclined braces 11 all attached at their inner ends to a stationary collar or sleeve 12 through which the shaft 3 passes.

Mounted upon each shaft 9 is a wing or blade 13 shown as rectangular in shape and having secured to the upper opposite corners thereof bearings or hangers 14 journaled on the shaft 9, each blade being thus pivotally swung from its upper edge on the respective shaft 9. The side bars 15 of each wing or blade have their lower ends offset or deflected as shown at 16 so as to come in contact with the bearings 14 on the next underlying shaft 9 while permitting the wing or blade 13 to assume a vertical position which is its working position when it is subjected to the full force of the wind, the blade being caused to assume such vertical position by the wind pressure thereon. Each of the bearings 14 is of hollow formation and comprises a substantially semi-circular bushing 17 in the upper half thereof which rests upon the respective shaft 9, the lower semi-circular portion of said bearing 14 being filled with wicking or other similar absorbent material as indicated at 18 saturated with oil or lubricant which is therefore constantly wiped upon the shaft 9 at the point where the bearing 14 is positioned.

Each blade or wing 13 has at or near the outer upper corner thereof a feathering arm 19. All of the arms 19 of each vertical series or group of wings or blades are connected by pivots 20 to a common operating or equalizing rod 21 so as to produce an equal feathering movement or action of the blades. Where the structure as a whole is of considerable height, the frame-work may comprise additional intermediate cross bars or braces 22, as many as may be found necessary.

The means for counterbalancing and automatically feathering the blades will now be described. On the bottom shaft 9 of each vertical series of blades, there is mounted a sleeve 23 which is slidable longitudinally of the shaft 9. At its outer end the sleeve 23 carries a stud shaft 24 which extends at a right angle thereto and has mounted thereon a roller 25 adapted to coöperate with an inclined track 26 arranged at one side of but having a fixed relation to the shaft 9 adjacent to the outer extremity thereof. At the opposite side of the shaft 9 there is another stud shaft 27 extending at a right angle to the shaft 9 and having journaled thereon the lower extremity of a link 28 the upper extremity of which is connected by a pivot 29 to the lower extremity of the adjacent equalizing rod 21. Interposed between the outer end of the sleeve 23 and a collar 30 on the outer extremity of the respective shaft 9 is a coiled compression spring 31 encircling the shaft 9 and serving to yieldingly press the sleeve 23 toward the shaft 3'. Extending laterally from each sleeve 23 is an arm 32 having mounted thereon a weight 33 adjustable by means of a set screw 34. The weight 33 is located at the opposite side of the sleeve 23 from the roller 25 and therefore as the roller 25 moves upwardly along the inclined track 26, as the weight 33 moves outward by centrifugal action, the weight is caused to move downwardly and the link 28 is also moved downwardly, thereby drawing downwardly on the respective equalizing rod 21 and elevating the free edges of the wings or blades 13 until they assume a substantially horizontal or feathering position. When the motor or mill is at rest, the wings or blades 13 are counterbalanced by the weights 33 and are held substantially at the angles of inclination shown in the central position of Fig. 1 that is inclined at an angle of approximately 35 or 40° from the vertical. As the motor is actuated by wind pressure, the blades which are subjected to the direct pressure of the wind are caused to assume vertical positions thus presenting their combined areas to the full force of the wind. All of the other wings or blades are at that time feathered so as to decrease their resistance. This enables the mill or motor to operate with maximum power. When the velocity of the wind increases to a dangerous degree, the speed of rotation causes the weights 33 to move outward by centrifugal action which results, as above described, in the complete feathering of all of the blades thus saving the motor from injury.

The means for manually throwing the mill or motor out of the wind, comprises a sleeve or runner 35 slidable up and down on the lower portion of the shaft 3' and having connected pivotally thereto links 36 which are in turn pivotally connected at their outer extremities to other runners 37 slidable on the respective shafts 9 against the inner ends of the sleeves 23. 38 designates a hand lever which is fulcrumed at 39 on a fulcrum post 40 having a jointed or hinged connection at 41 with a supporting base 42 and provided with a hook 43 at a suitable point. The lever 38 is pivotally connected at one end to a collar or fork which is received in a groove in the runner 35. The lever 38 has attached thereto a holding chain or flexible connection 45 which is adapted to engage the hook 43 to hold the free end of the lever down, in which position, the runner 35 is elevated and the sleeves 23 thrust outwardly until all of the blades or wings 13 are feathered or thrown out of the wind. 46 designates a power transmission shaft having a bevel gear 47 which meshes with and is driven by another bevel gear 48 on the shaft 3'. 49 designates a brake drum on the shaft 3' around which extends a brake band 50 operable by means of a hand lever 51 by means of which braking power may be applied to the shaft 3' for the purpose of arresting the motion of the motor and holding the same stationary.

From the foregoing description taken in connection with the accompanying drawings it will now be understood that the motor or mill comprises a plurality of vertical columns or series of blades or wings mounted on substantially horizontal shafts to swing on substantially horizontal axes. The said blades or wings are hung from their upper edges and they are all connected for simultaneous feathering movement by equalizing rods. These rods are operatively associated with centrifugally controlled members in such manner that when said centrifugal members are moved outwardly, the blades or wings are automatically feathered. At all other times, said blades or wings are counterbalanced by the weights of the centrifugal members. The mechanism for controlling the feathering movement of the blades or wings is simple, effective and reliable. It will of course be understood that the structure as a whole may be made of any desired height or other dimensions, that any required number of vertical series or columns of wings may be employed and that the number of wings or blades in each series may be increased or diminished in accordance with the power required to be developed by the motor. These and other changes in the form, proportion and minor details of construction may be resorted to without departing from the principle or sacrificing any of the advantages of the invention.

I claim:—

1. In a wind motor, the combination of a centrally arranged vertical rotary shaft, substantially horizontal shafts radiating from said shaft and superimposed one above another, vertical series of feathering blades pivotally swung on the last named shafts and arranged in several vertical series, and a centrifugally operable member slidable on a horizontal shaft of each series and operatively connected with all of the blades of the respective series.

2. In a wind motor, the combination of a centrally arranged vertical rotary shaft, substantially horizontal shafts radiating from said shaft and superimposed one above another, vertical series of feathering blades pivotally swung on the last named shafts and arranged in several vertical series, a centrifugally operable member slidable on a horizontal shaft of each series and operatively connected with all of the blades of the respective series, and blade balancing means carried by said centrifugally operated member.

3. In a wind motor, the combination of a centrally arranged vertical rotary shaft, substantially horizontal shafts radiating from said shaft and superimposed one above another, vertical series of feathering blades pivotally swung on the last named shafts and arranged in several vertical series, a centrifugally operable member slidable on a horizontal shaft of each series and operatively connected with all of the blades of the respective series, and blade balancing means carried by said centrifugally operated member, said means being adjustable toward and away from the center of the shaft on which said centrifugally operated member is mounted.

4. In a wind motor, the combination of a centrally arranged vertical rotary shaft, substantially horizontal shafts radiating from said shaft and superimposed one above another, vertical series of feathering blades pivotally swung on the last named shafts and arranged in several vertical series, a centrifugally operable member slidable on a horizontal shaft of each series and operatively connected with all of the blades of the respective series, said centrifugally operated member embodying a weighted sleeve, an equalizing rod operatively connected with all of the blades of the respective series, and a link connected with said equalizing rod and also connected with said sleeve.

5. In a wind motor, the combination of a centrally arranged vertical rotary shaft, substantially horizontal shafts radiating from said shaft and superimposed one above another, vertical series of feathering blades pivotally swung on the last named shafts and arranged in several vertical series, a centrifugally operable member slidable on a horizontal shaft of each series and operatively connected with all of the blades of the respective series, said centrifugally operated member embodying a weighted sleeve, an equalizing rod operatively connected with all of the blades of the respective series, a link connected with said equalizing rod and also connected with said sleeve, and yieldable means for resisting the outward movement of said centrifugally operated member.

6. In a wind motor, the combination of a centrally arranged vertical rotary shaft, substantially horizontal shafts radiating from said shaft and superimposed one above another, vertical series of feathering blades pivotally swung on the last named shafts and arranged in several vertical series, a centrifugally operable member slidable on a horizontal shaft of each series and operatively connected with all of the blades of the respective series, said centrifugally operated member embodying a weighted sleeve, an equalizing rod operatively connected with all of the blades of the respective series, a link connected with said equalizing rod and also connected with said sleeve, a roller carried by said sleeve, and an inclined track with which said roller coöperates, said track having a fixed relation to the shaft on which the centrifugally operated member is mounted.

7. In a wind motor, the combination of a centrally arranged vertical rotary shaft, substantially horizontal shafts radiating from said shaft and superimposed one above another, vertical series of feathering blades pivotally swung on the last named shafts and arranged in several vertical series, a centrifugally operable member slidable on a horizontal shaft of each series and operatively connected with all of the blades of the respective series, said centrifugally operated member embodying a weighted sleeve, an equalizing rod operatively connected with all of the blades of the respective series, a link connected with said equalizing rod and also connected with said sleeve, a roller carried by said sleeve, an inclined track with which said roller coöperates, said track having a fixed relation to the shaft on which the centrifugally operated member is mounted, said roller serving to oscillate said sleeve, an arm extending laterally from said sleeve, and a blade balancing weight on the last named arm.

8. In a wind motor, the combination of a centrally arranged vertical rotary shaft, substantially horizontal shafts radiating from said shaft and superimposed one above another, vertical series of feathering blades pivotally swung on the last named shafts and arranged in several vertical series, a centrifugally operable member slidable on a horizontal shaft of each series and operatively connected with all of the blades of the respective series, and manually controlled means for simultaneously operating the feathering means of all of the series of blades.

In testimony whereof I affix my signature.

JAMES H. CONNOLLY.

Copies of this patent may be obtained for five cents each, by addressing the "Commissioner of Patents, Washington, D. C."